H. A. GREAVES & H. ETCHELLS.
ELECTRIC FURNACE.
APPLICATION FILED FEB. 18, 1919.

1,301,932.

Patented Apr. 29, 1919.

Witnesses
Horace P. Harwood.
Augustus B. Coppes

Inventors
Henry A. Greaves.
Harry Etchells.
By Joshua R. H. Potts
Their Attorney

H. A. GREAVES & H. ETCHELLS.
ELECTRIC FURNACE.
APPLICATION FILED FEB. 18, 1919.

1,301,932.

Patented Apr. 29, 1919.
3 SHEETS—SHEET 3

Witnesses
Horace P. Harwood.
Augustus B. Coppee

Inventors
Henry A. Greaves.
And Harry Etchells.
By Joshua R. H. Potts
Their Attorney

UNITED STATES PATENT OFFICE.

HENRY ARNOLD GREAVES AND HARRY ETCHELLS, OF SHEFFIELD, ENGLAND.

ELECTRIC FURNACE.

1,301,932.  Specification of Letters Patent.  Patented Apr. 29, 1919.

Application filed February 18, 1919. Serial No. 277,880.

*To all whom it may concern:*

Be it known that we, HENRY ARNOLD GREAVES and HARRY ETCHELLS, subjects of the King of Great Britain and Ireland, both residing at Sheffield, county of York, England, have invented certain new and useful Improvements in Electric Furnaces, of which the following is a specification.

This invention relates to electric furnaces of the kind described in our United States Patent No. 1,257,997, dated March 5th, 1918, in which, in one case, three transformer secondary windings (or groups of three transformer secondary windings) are connected to one another in star while the outer terminals of two of the said windings are connected to two upper electrodes and the outer terminal of the third winding is connected to the bottom electrode or hearth of the furnace. In this arrangement the primary transformer windings are connected in delta and the transformation ratio of the windings connected to the hearth electrode is higher than that of the other transformer windings connected to the two upper electrodes.

In the other case in said United States patent, two secondary windings (or groups of secondary windings) are arranged so that one end of one secondary winding is connected to the midpoint of the other secondary winding, while the two ends of the winding having the middle connection are connected to the two upper electrodes, and the free end of the other winding is connected to the bottom electrode or hearth of the furnace.

With this arrangement the primary transformer windings are connected in the usual way to a two phase electric power supply and the transformation ratio of the windings connected to the two top electrodes is less than that of the transformer windings connected to the hearth electrode.

The invention of the present application also relates to electric furnaces of the kind described in our pending application No. 121,563, for British patent, in which three secondary windings (or groups of three transformer secondary windings) are connected to each other in delta, while two junctions of the transformer windings are connected to the two upper electrodes and the third junction of the transformer windings is connected to the bottom electrode or hearth of the furnace.

In the arrangement referred to the primary transformer windings are connected in star and the transformation ratio of the winding, two ends of which are connected to the two upper electrodes, is less than that of the other two transformer windings which are connected to the hearth electrode.

The arrangement of transformer windings referred to in the aforesaid United States patent and pending British application can be applied to furnaces with multiples of two upper electrodes and with one or more hearth electrodes by arranging the groups of transformer windings in parallel with each other.

The object of our present invention is to provide an electric furnace installation of this kind in which the energy received from the mains is applied and utilized in the most advantageous manner within the furnace. The advantages derived from the system proposed are that by means of varying the transformer connections the normal current transmitted by the hearth of the furnace can be varied over a very wide range, viz., from *nil* to .707 times the sum of the currents carried by all the electrodes; and also the hearth of the furnace, when the normal current transmitted by the hearth is *nil* can be made of electrically non-conducting materials.

The invention is clearly shown by the accompanying diagrammatic drawings in which—

Figures 1 to 14, inclusive, represent groups of transformer windings as described in our aforesaid United States patent and pending British application.

Referring to Fig. 1 of the drawing, $a$ and $b$ represent delta-connected primary transformer windings exciting star-connected secondary transformer windings O' A' B' C' and O A B C respectively.

In Fig. 2, $a$ and $b$ represent star-connected primary transformer windings exciting delta-connected secondary transformer windings A' B' C' and A B C respectively.

In Fig. 3, $a$ and $b$ represent two-phase primary transformer windings exciting T connected secondary transformer windings A' B' C' and A B C respectively.

In Figs. 1, 2, and 3, E E E E represent the four upper electrodes of the furnace and "H" the hearth electrode, and the secondary windings in each case are connected in phase with each other whereby the current transmitted by the hearth "H" is twice the current due to that of one transformer group operated alone.

Figure 1:
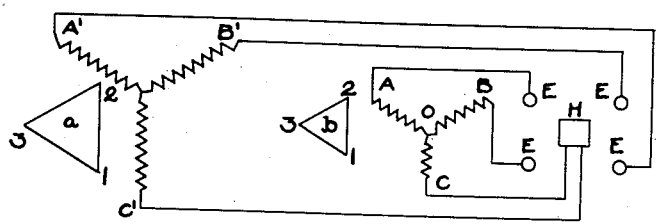
Figure 2:
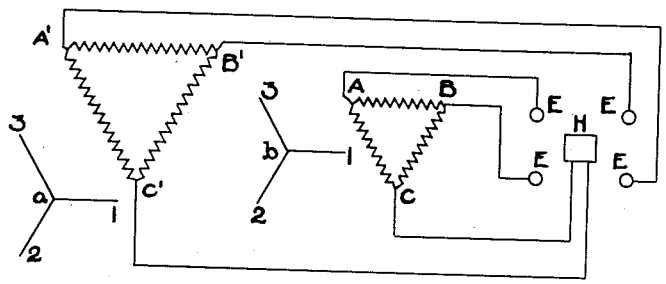
Figure 3:
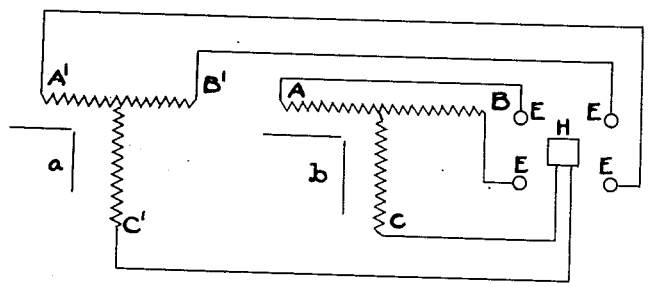
Figure 4:
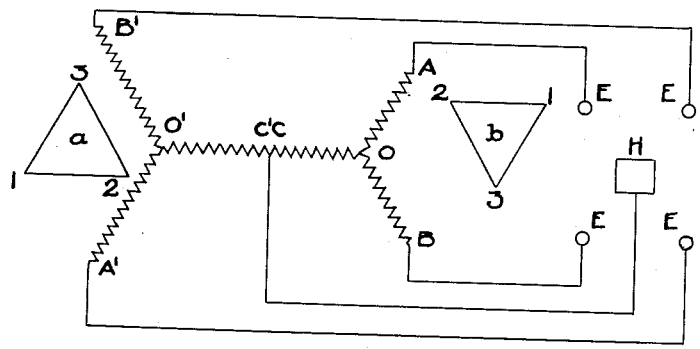
Fig. 4 shows two groups of star-connected transformer secondary windings O' A' B' C' and O A B C connected 180° out of phase with each other.
Figure 5:
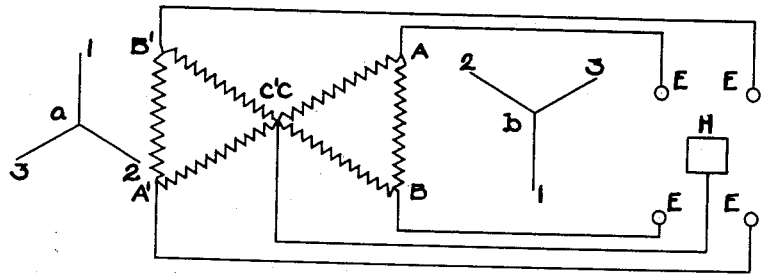
Fig. 5 shows two groups of delta connected transformer secondary windings A' B' C' and A B C connected 180° out of phase with each other.
Figure 6:
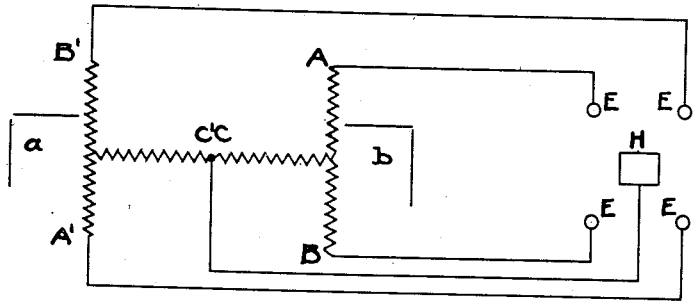
Fig. 6 shows two groups of T connected transformer secondary windings A' B' C' and A B C connected 180° out of phase with each other.

With the arrangements shown in Figs. 4, 5, and 6 the current transmitted by the hearth "H" is *nil* when the upper electrodes are carrying equal currents.

Figure 7:
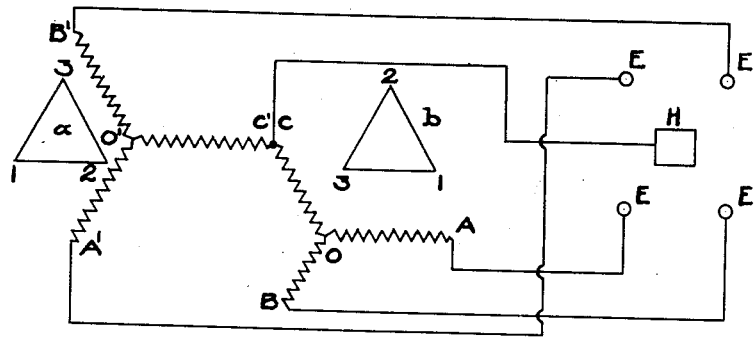
Figure 8:
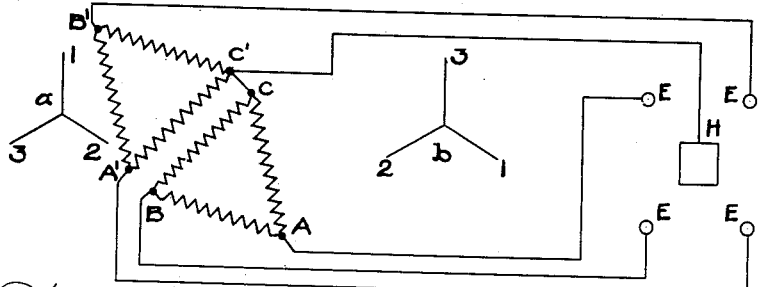

Figs. 7 and 8 represent two groups of star-connected and delta-connected transformer secondary windings respectively 120° out of phase.

With these arrangements the current transmitted by the hearth "H" is equal to the current due to one transformer group only operated alone.

Figure 9:
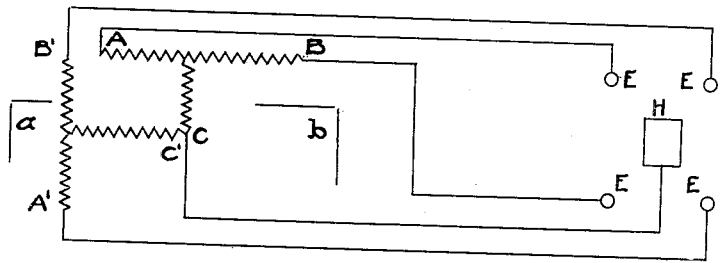

Fig. 9 represents two T connected groups of transformer secondary windings 90° out of phase. With this arrangement the current transmitted by the hearth "H" is 1.41 times the current due to one transformer group only operated alone.

The same phase rotation of transformer windings can be effected with three, or even more, groups of transformer windings. There being two upper electrodes for each transformer group. In certain cases, such as in Fig. 9, where the potential between points A and B' is negligible, these points may be connected together and one electrode used instead of two.

Figure 10:
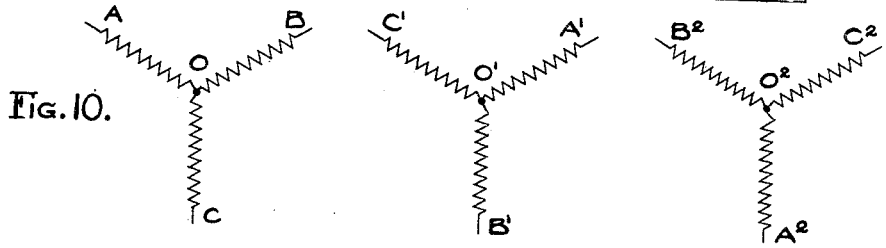
Figure 11:
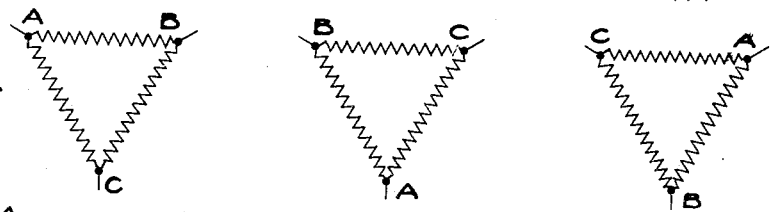

Figs. 10 and 11 each shows three groups of star and delta connected secondary windings respectively, each group 120° out of phase with the other groups in the same figure. With these arrangements the current transmitted by the hearth is *nil* when the upper electrodes are carrying equal currents.

Figure 12:
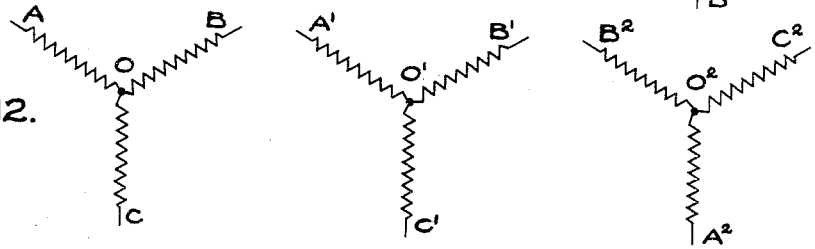
Figure 13:
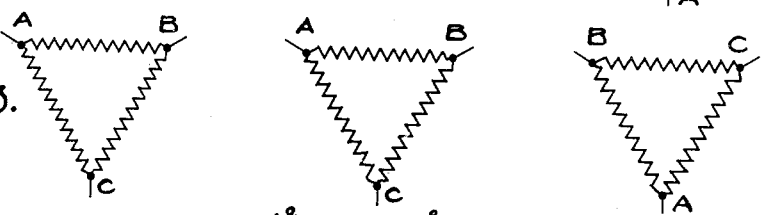

Figs. 12 and 13 each shows three groups of star and delta connected secondary windings respectively, two groups being in phase with each other, and the other group 120° out of phase. With these arrangements the current transmitted by the hearth will be twice that due to one group of transformer windings operated alone.

Figure 14:
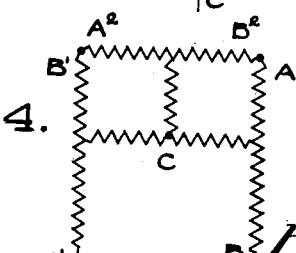

Fig. 14 shows three T connected groups of transformer secondary windings, two of which are connected 180° out of phase, and the third group is 90° out of phase with both the other groups. With this arrangement the current transmitted by the hearth will be equal to that due to one group of transformer windings operated alone.

It will be readily seen that this phase rotation of transformer groups can be considerably extended, but those illustrated will be sufficient to show the manner in which the phase rotation can be carried out.

In our aforesaid pending British application it is described that the transformation ratio of the transformer windings is varied for different values of hearth resistance, as compared with the resistance of one of the arcs. With the arrangements shown in Figs. 4, 5, 6, 10 and 11 the hearth resistance may be assumed to be *nil* since no current passes through the hearth when the upper electrode currents are equal and the transformation ratios of the windings are therefore arranged in these cases accordingly, as described in our aforesaid pending British application and United States patent.

While we have described our invention as taking particular forms, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:

1. In electric furnace installations of the kind referred to having two or more sets of transformer windings, the improved connections comprising the inversion of polarity or the rotation of phase of 90°, 120°, 180°, 240°, or 270° of one group of transformer windings relatively to the phase or phases of other group or groups of transformer windings, substantially as and for the purpose set forth.

2. In electric furnace installations of the kind referred to, having two or more groups of transformer windings, the improved connections comprising the inversion of polarity or phase rotation, as illustrated in Figs. 4, 5, 6, 10 and 11, where the hearth of the furnace can be made up of electrically non-conducting materials.

3. In electric furnace installations of the kind referred to having two or more sets of transformer windings, the improved connections comprising the inversion of polarity or rotation of phase whereby the current transmitted by the hearth can be varied over a very wide range, viz., from *nil* to .707 times the sum of the currents carried by all the electrodes.

4. In electric furnace installations of the kind referred to having two or more sets of transformer windings, the arrangements where the difference of potential between two electrode connections is negligible, two connections may be connected together and one electrode of suitable section used instead of two.

5. In electric furnace installations of the kind referred to having two or more sets of transformer windings, the improved connections of transformer windings, substantially as described and illustrated in Figs. 4 and 14 of the accompanying drawings.

6. An electric furnace installation of the character described having a plurality of sets of transformer windings, the connections of said windings comprising the inversion of polarity of one set of transformer windings relatively to the phase of another of said sets of said windings, substantially as described.

7. An electric furnace installation of the character described having a plurality of sets of transformer windings, said sets of windings being angularly disposed out of phase with each other, substantially as described.

In testimony whereof we have signed our names to this specification in the presence of two subscribing witnesses.

HENRY ARNOLD GREAVES.
HARRY ETCHELLS.

Witnesses:
 WILLIAM TRAVIS,
 FRANK WALKER.